I. S. PURCELL.
TENT.
APPLICATION FILED JULY 14, 1919.
1,394,579.
Patented Oct. 25, 1921.
2 SHEETS—SHEET 2.
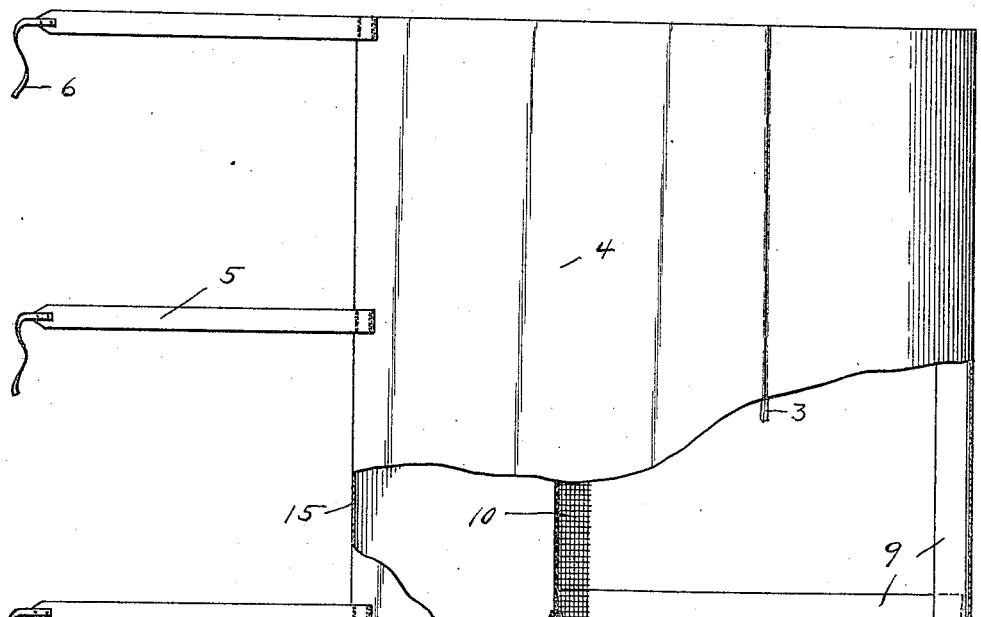
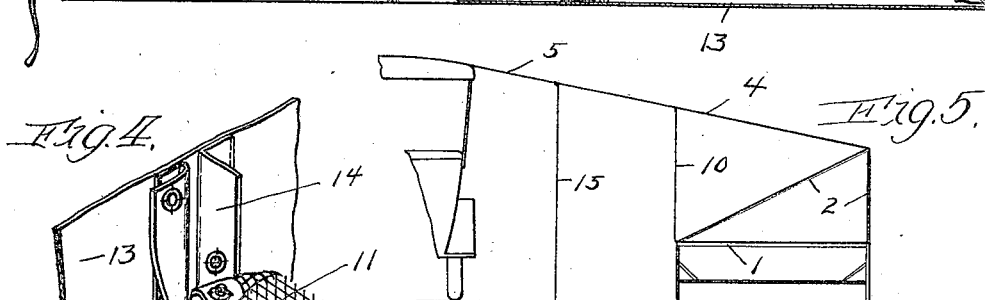
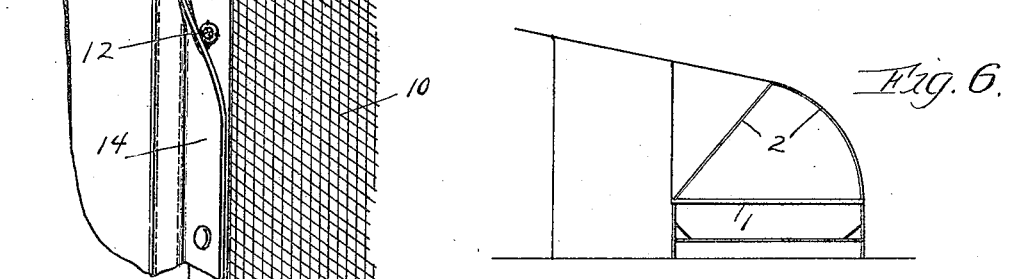
Inventor:
Isaac S. Purcell

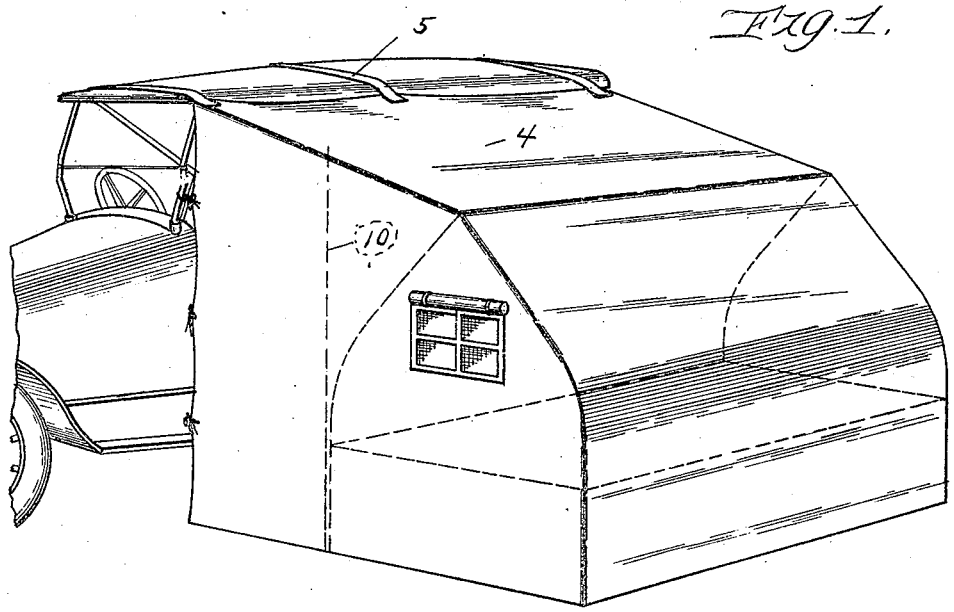
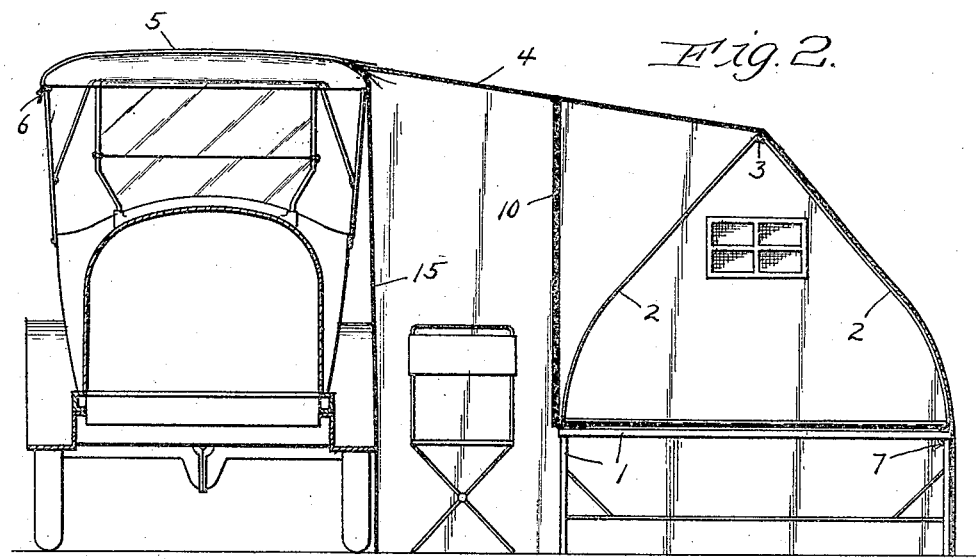

UNITED STATES PATENT OFFICE.

ISAAC S. PURCELL, OF OAK PARK, ILLINOIS, ASSIGNOR TO TENTOBED COMPANY, OF CHICAGO, ILLINOIS, A CORPORATION OF ILLINOIS.

TENT.

1,394,579.   Specification of Letters Patent.   Patented Oct. 25, 1921.

Application filed July 14, 1919. Serial No. 310,795.

*To all whom it may concern:*

Be it known that I, ISAAC S. PURCELL, citizen of the United States, residing at Oak Park, Illinois, have invented certain new and useful Improvements in a Tent; and I do hereby declare the following to be a full, clear, and exact description of the invention, such as will enable others skilled in the art to which it appertains to make and use the same.

My invention relates to tents for tourists' use, one of its general objects being to provide an easily erected tent supported jointly by an elevated support (such as the top of an ordinary automobile) and by a frame mounted on an independently supported cot; and another object being to provide such a tent suitable for inclosing both the cot and the space between the cot and the automobile, thereby affording an inclosed anteroom or dressing room between the automobile and the cot. In another aspect, my invention aims to provide a tent inclosing both a cot and a space adjacent thereto, to provide an insect proof screen separating this adjacent space from the cot, and to provide means on this screen and on three sides of the tent for preventing insects from entering the space above the bed of the cot. Furthermore, my invention aims to provide a tent supported jointly by the roof of an automobile and by a cot which is supported independently of the automobile and which is placed lengthwise parallel to the automobile but spaced from the latter; to provide simple means for simultaneously securing the cot to the side of the tent farthest from the automobile, and for tensioning the roof of the tent; to provide an insect proof screen depending from the roof longitudinally of the cot alongside the latter; and to provide simple means, operable from either side of the screen for securing the screen in insect-excluding relation to the end portions of the tent. Still further objects will appear from the following specification and from the accompanying drawings, in which—

Figure 1 is a perspective view showing a tent embodying my invention, with an automobile forming part of its support.

Fig. 2 is a vertical section through the same, taken transversely of the cot and the automobile.

Fig. 3 is a plan view of the same embodiment, with the automobile omitted and a part of the roof of the tent cut away.

Fig. 4 is a fragmentary perspective view showing the method of fastening one edge of the depending screen to the adjacent end of the tent.

Fig. 5 is a diagrammatic vertical section through a tent showing another embodiment of my invention, in which the roof of the tent extends entirely over the cot and in which the free side of the tent depends vertically alongside the cot from the juncture of the free side with the roof.

Fig. 6 is a similar diagrammatic view showing a ridge-supporting frame in which one side only is arched.

For tourists' use, it has been customary for some years to provide tents supported directly by folding cots, as for example after the manner of my Patents #1285791 and 1286190 of Nov. 26, 1918, thereby providing a sheltering inclosure for the cot without requiring the ordinary tent poles, stakes and ropes. While this arrangement has been highly satisfactory for men, it has not entirely satisfied the women, as it afforded no concealed space outside of the cot. To overcome this, some cot and tent arrangements have been built in which the cot was supported at one end from the automobile and in which the tent roof adjoined the roof of the automobile, so that the interior of the latter could be used as a dressing room. With most makes of automobiles, this would afford direct connection only with one of the seats and the arrangement has further been objectionable, because of the impossibility of screening the automobile side of the tent to prevent the entrance of insects.

Generally speaking, my invention aims to overcome these various objections and to provide a still more advantageous and spacious tourist's tent supported partly by a cot and partly by another support (such as an automobile); also, to provide this so that if used with an automobile it will afford a ready connection to both seats of the automobile and will provide an additional dressing room space between the automobile and the cot, besides providing unusually effective means for excluding insects from the sleeping compartment of the tent.

Referring to the drawings, Figs. 1 to 3 show an embodiment in which the cot frame 1 supports ribs 2 carrying the ridge pole 3, the ribs being desirably flexible only in their lower portions and socketed in vertical sockets on the cot frame, so as to produce the Gothic arch effect described in said Patent #1285791. The cot with the ridge-supporting frame on it is thus erected on the ground at a distance from the automobile, but with the side of the cot parallel to that of the auto. Then, one edge of the roof 4 of the tent is fastened to the top of the automobile, desirably by wide tapes 5 terminating in straps 6 which are secured to the bows at the farther side of the auto, after which the farther side and the ends of the tent are drawn down over the cot and the ridge-supporting frame. When thus in position, the roof 4 extends from the edge of the automobile top to the ridge pole, while the free side of the tent extends downwardly from the ridge pole in substantial continuation of the roof to the ground, being desirably secured to the frame of the cot by straps 7. The tent ends are likewise secured both to the automobile and to the frame of the cot by suitable straps, and the entrance of insects to the sleeping compartment over the bed of the cot along the free side and along the two ends of the tent is prevented by flaps 9 overlying the bed of the cot after the manner shown in my Patent #1255225 of Feb. 5, 1918.

To close the fourth side of the sleeping compartment (which is the space within the tent over the bed of the cot), I provide a screen 10 secured at its upper end to the roof and depending parallel and adjacent to the inner side of the cot frame. This screen desirably is provided at its lateral edges with a binding 11 having fastening elements on it, such as the glove fastener parts 12. Then I equip each end wall 13 of the tent with at least one flap 14 having fastening elements coöperating with those on the screen for securing the lateral flap on the screen tightly to the flap on the adjacent end wall. For example, I may equip each end wall with a pair of such flaps as shown in Fig. 4, these flaps having the socketing portions of glove fasteners on their opposed faces, so that these fastener parts on either one may be used in connection with male fastener parts on the screen, thereby permitting the buttoning to be effected either from the inside or the outside of the sleeping compartment. By so doing, I can readily prevent the entrance of insects along the two ends of the screen. Then I make the screen of a length which would reach considerably below the bed of the cot when freely depending from the roof, and use the surplus lower end portion as a flap overlying the bed of the cot and held in place by the bedding. Thus arranged, the four flaps carried respectively by the screen, by the two tent ends and by the free tent side, coöperate with the bed of the cot, the tent portions carrying the flaps, and the roof of the tent for entirely inclosing the sleeping compartment to exclude insects from the same.

To increase the privacy, I also desirably provide a curtain 15 depending from the roof close to the automobile, which curtain may be lowered to form a fourth tent side when desired, thereby affording an inclosed dressing room between automobile and the cot. This dressing room can readily be connected to the space between the seats of the automobile by raising the curtain; and as this space is continuously connected to the storage space under the cot, it will be evident that my arrangement affords unusual facilities both for privacy in dressing and undressing and for storing clothes and other articles.

Furthermore, since one side of the sleeping compartment is open to the interior of the tent, I do not require a great height above the bed of the cot for the ridge pole and am therefore able to secure a sufficient slope to the roof to insure a ready shedding of the water in wet weather, while still securing ample head room at the screened side of the cot to make it easy for the occupants to enter the cot. Likewise, the same straps which fasten the free side of the tent to the frame of the cot also serve for tensioning the roof, as the weight of the cot will prevent this from being tilted by the tension of the tent roof and hence will avoid a sagging of the roof. Furthermore, since the sleeping compartment is separated from the adjacent portion of the tent only by a screen, I secure the benefit of the larger air space in the tent as a whole, thereby avoiding stuffiness within the tent on windless nights.

However, while I have theretofore described my invention in a desirable embodiment including a ridge pole supported centrally over the cot by ribs which are arched so as to permit the full width of the cot to be effectively occupied, and have shown an automobile top as affording part of the support, I do not wish to be limited to these or other details of the construction and arrangement here disclosed, it being obvious that the same might be modified in many ways without departing from the spirit of my invention. For example, Fig. 5 shows an embodiment in which the ridge pole is supported over the outer edge of the cot, while Fig. 6 shows a construction in which the roof is tangential to the tent side and in which I employ curved ribs only at the outer side of the cot, thereby connecting the roof of the tent through a curved portion with the vertically depending lower side portion of the tent. So also, Fig. 5 shows the curtain 15 as spaced from the automobile to afford a passage between the latter and the tent proper.

I claim as my invention:

1. In a tent for an automobile, a movable and independent cot spaced therefrom, a frame having a ridge pole supported by the cot, and a tent supported jointly by the said frame and the automobile and inclosing both the cot and the space between the cot and the automobile, the tent including a roof stretched between the top of the automobile and the ridge pole of the frame; a screen depending from the roof in substantial vertical alinement with the side of the cot directed toward the automobile, and means on the tent ends for securing the vertical edges of the screen thereto.

2. In a tent for an automobile, a movable and independent cot spaced from and parallel to the automobile, risers on the ends of the cot, a ridge pole carried by the risers, and a tent supported entirely by the ridge pole and the top of the automobile, the tent inclosing both the cot and the space between the latter and the automobile.

3. A structure as per claim 2, including a curtain depending from the roof of the tent adjacent to the automobile and on the side of the latter directed toward the cot.

4. An automobile tent including a cot having a ridge pole, and a tent wall doubled upon itself and secured at the point of doubling to a side of the automobile top and having one part depending vertically along said side of the automobile, the other part of the wall extending downwardly and outwardly and engaged with the ridge pole and thence extending downwardly over the outer side of the cot.

5. An automobile tent according to claim 4 which includes a screen depending from the tent roof and having the screen bottom underlapping the bed of the cot and held in place thereby.

6. An automobile tent including a cot spaced from a side of the autmobile, a frame having a ridge pole supported by the cot, a tent roof supported by the automobile and by the ridge pole and having a wall extending over the outer side of the frame and cot, and a curtain depending from the tent roof and spaced from the cot to afford an ante-room between the cot and the automobile and to also screen off vision from the automobile and to enable the user to enter the ante-room from the automobile interior and from the ante-room to gain access to the cot.

7. An automobile tent according to claim 6 which has a screen depending from the tent roof and having the screen bottom underlapping the bed of the cot and held in place thereby.

8. An automobile tent including a cot, a frame having a ridge pole supported by the cot, a tent roof supported by the automobile and by the ridge pole and having a wall extending over the outer side of the frame and cot, a curtain depending from the tent roof and spaced from the cot to afford an ante-room between the cot and the automobile and to also screen off vision from the automobile, a screen depending from the tent roof, end walls secured to the tent roof and forming complete end closures for the frame and the ante-room, and detachable means to secure the screen ends to said end walls.

9. An automobile tent including a movable cot so as to be positioned in spaced relation to the automobile and independent thereof, a frame having a ridge pole carried by the cot, and a tent supported by the automobile and engaged over the ridge pole and with the outer side of the cot and extending over the space between the automobile and the cot, said space between the automobile and cot affording an ante-room accessible from the automobile interior and also affording access to the cot.

Signed at Chicago, Illinois, July 7th, 1919.

ISAAC S. PURCELL.